Feb. 21, 1950 S. F. ERPF 2,497,873
ARTIFICIAL EYE
Original Filed Nov. 8, 1944 2 Sheets-Sheet 1
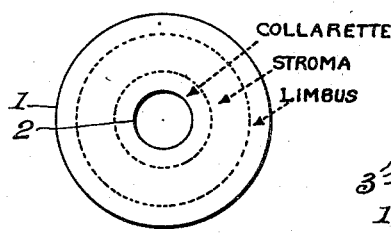
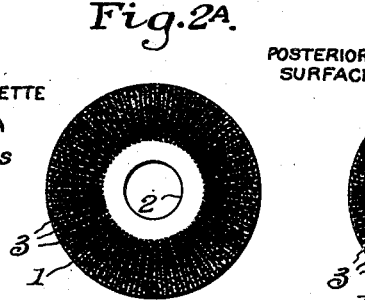
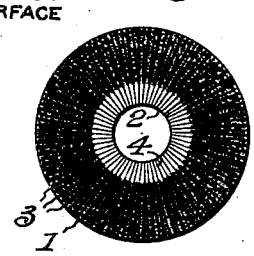
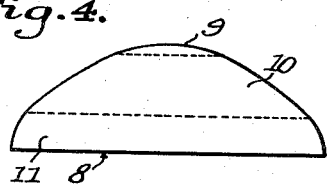
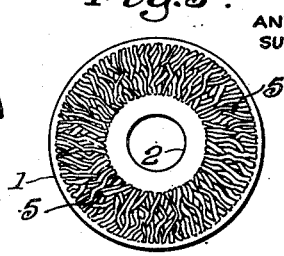
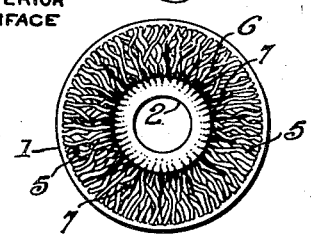
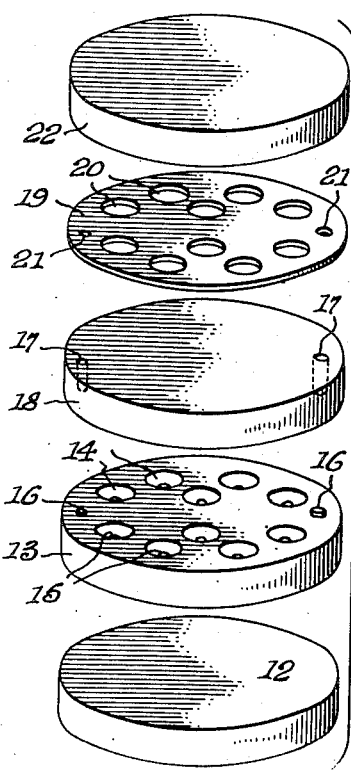
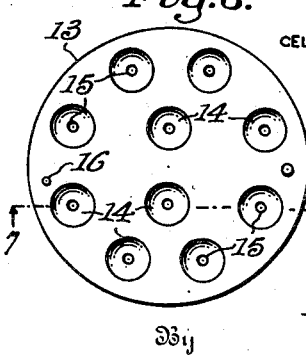
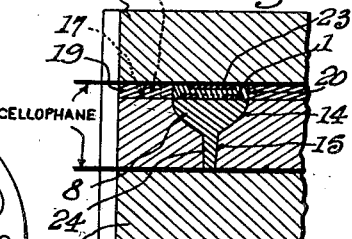
Inventor
Stanley F. Erpf
By
Attorneys Feb. 21, 1950   S. F. ERPF   2,497,873
ARTIFICIAL EYE
Original Filed Nov. 8, 1944                    2 Sheets-Sheet 2
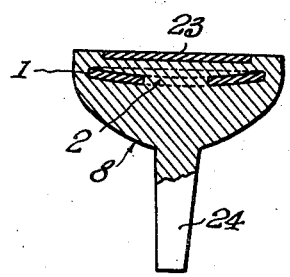
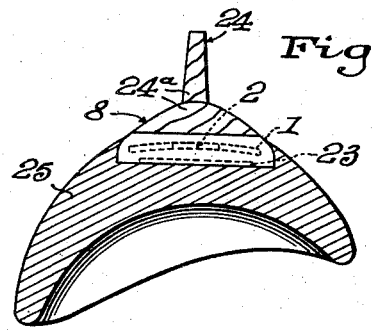
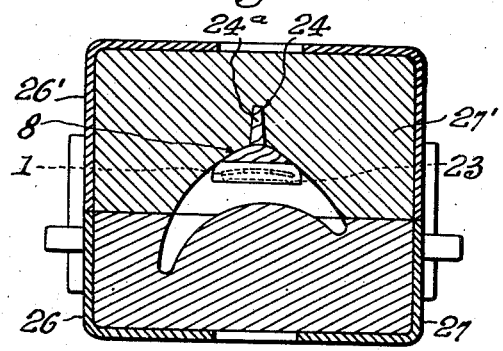
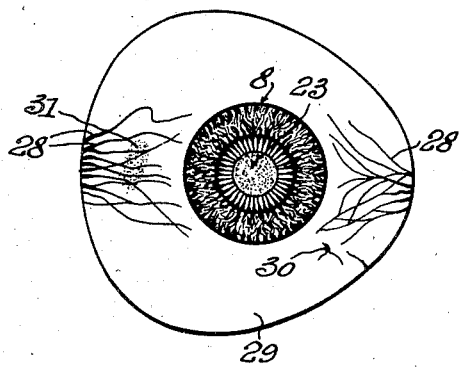
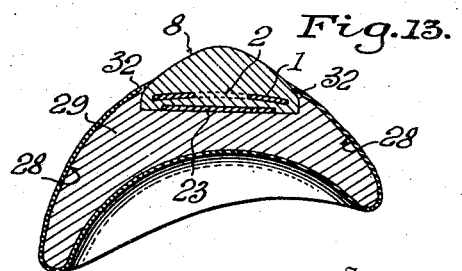
Inventor
Stanley F. Erpf
By
Attorneys Patented Feb. 21, 1950

2,497,873

UNITED STATES PATENT OFFICE 2,497,873

ARTIFICIAL EYE

Stanley F. Erpf, San Francisco, Calif.

Original application November 8, 1944, Serial No. 562,538. Divided and this application March 19, 1947, Serial No. 735,588

6 Claims. (Cl. 3—13)

(Granted under the act of March 3, 1883, as amended April 30, 1928; 370 O. G. 757)

The invention described herein may be manufactured and used by or for the Government for governmental purposes, without payment to me of any royalty thereon.

This invention relates to artificial eyes formed of synthetic resinous materials and to methods of producing prosthetic devices of this type. This application is a division of application Serial No. 562,538, filed November 8, 1944 by Stanley F. Erpf, Victor H. Dietz and Milton S. Wirtz.

The art of manufacturing artificial glass eyes has been developed to an advanced stage, particularly in foreign countries, with the result that quite life-like reproductions of natural eyes have been obtainable. It has been appreciated for many years, however, that these glass prosthetic devices are not satisfactory. For example, artificial glass eyes are uncomfortable to the wearer owing to their poor compatability with body tissues, their characteristics when exposed to sudden changes in temperature, and, finally owing to the difficulty of conforming the artificial eye to the orbital cavity, especially when tissue or muscle changes occur subsequent to fitting. The fragile nature and poor wearing qualities of artificial glass eyes are additional well known disadvantages.

Numerous attempts have been made to produce artificial eyes of materials other than glass, such as, rubber, cellulose plastics and synthetic resins. While many of these prosthetic devices have overcome some of the disadvantages of artificial glass eyes, none has been entirely satisfactory. One such attempt was disclosed in Patent No. 1,993,121, issued March 5, 1935, to James L. Travers, which comprised providing an artificial eye consisting of a ball portion formed of a translucent thermoplastic synthetic resin welded to a relatively thin layer of a transparent thermoplastic resin and an iris member supported therebetween comprising a photograph or other reproduction of the principal colored portion of the eye printed on paper. This prosthetic device represented a material contribution to the art but has not been wholly satisfactory since artificial eyes prepared in accordance with the method disclosed in the above patent were found not to possess a life-like appearance. It has been found that an iris member formed of a photograph or coloring material deposited on paper and similar opaque material has a flat, lifeless appearance and lacks depth. Also, it has been found that an iris member covered by a preformed transparent cover reflects unnatural colors and that the transparent cover produces high lights which destroy the natural appearance of the eye.

This invention is an improvement over the invention disclosed in the above patent and consists of an artificial eye comprising a ball or sclera portion formed of a translucent synthetic resin and having fine strands of rayon fibres on the surface thereof to simulate veins, an iris button formed of a transparent synthetic resin, and an extremely thin conjunctiva layer of a transparent synthetic resin applied by dipping or spraying. The iris button is a transparent synthetic resin member having a hemi-spheroidal shape consisting of segments corresponding to the segments of unequally sized spheres as will be more fully described below. An iris member and a pupillary member are embedded in the iris button, preferably by inserting the members in a partially polymerized synthetic resin and thereafter polymerizing the resinous material under heat and pressure. The iris member comprises a transparent annular disc having a heavy pigmented coating on its posterior surface and a light pigmented coating on the anterior surface thereof. The coloring materials are preferably light-fast, oil pigments and are applied to areas of the annular disc corresponding to the limbus, collarette and stroma areas of a natural iris to reproduce the colors and markings occurring therein. The colors applied to the anterior surface of the disc are deposited in such a manner as to permit visual perception therethrough of the coloring material deposited on the posterior surface of the disc. The pupillary member comprises a coloring material, preferably a disc of jet black vinyl acetate sheeting, positioned either immediately adjacent or spaced apart from the posterior surface of the iris member. The pupillary member extends across the opening in the iris member thus reproducing the appearance of the pupil in a natural eye.

The object of this invention is to provide an artificial eye formed of synthetic resinous materials having separate iris and pupillary members adapted to produce a three-dimensional effect and thus provide an especially life-like appearance.

Another object of this invention is to provide an artificial eye formed of synthetic resinous material and having an iris comprising a transparent member with coloring material deposited thereon in areas corresponding to the limbus, collarette and stroma areas of a natural iris for reproducing the coloring and markings of a natural iris.

Another object of this invention is to provide an artificial eye formed of synthetic resinous material having an iris member comprising a transparent disc provided with a heavy pigmented coating on one face thereof and a light pigmented coating on the other face through which the colors of the heavy pigmented coating are visible.

Another object of this invention is to provide an artificial eye formed of synthetic resinous material having a transparent annular disc with coloring material deposited on opposite faces thereof and a separate pupillary member comprising a coloring material disposed behind the iris member and across the aperture therein either in contact with the iris member or spaced apart therefrom.

Still another object of this invention is to provide an artificial eye having a translucent synthetic resinous ball or sclera portion with colored rayon fibres supported on the surface thereof simulating veins and a conjunctiva member comprising a thin layer of transparent synthetic resin applied over the surface of the ball portion in a manner so as to permit the fibres to produce slight ridges in the conjunctiva surface.

A further object of this invention is to provide an artificial eye comprising a ball portion formed of a translucent synthetic resin and an iris button formed of a transparent synthetic resin having an iris member embedded therein.

A further object of this invention is to provide a hemispheroidally shaped iris button formed of a transparent synthetic resin with separate iris and pupillary members embedded therein which is adapted to be incorporated with precision into a ball or sclera member formed of a translucent synthetic resin.

A still further object of this invention is to provide a simple, inexpensive method of producing an artificial synthetic resin eye for an individual patient or for producing a stock of artificial eye elements from which natural appearing artificial eyes may be readily prepared.

Other objects will be apparent from the following description of the invention and the accompanying drawings in which:

Figure 1 is a diagrammatic top plan view of the iris disc indicating the areas thereof to be defined by coloring materials;

Figures 2A and 2B are bottom plan views of the iris disc showing the pigmented coating applied to the posterior surface of the disc;

Figures 3A and 3B are top plan views of the iris disc showing the pigmented coating applied to the anterior surface of the disc;

Figure 4 is a diagrammatic sectional side view showing the spheroidal contour of the iris button;

Figure 5 is an exploded perspective view of the mold for forming the iris button;

Figure 6 is a top plan view of the die plate for forming the lower portion of the iris button;

Figure 7 is a side view in cross-section taken along the line 7—7 of Figure 6 of the mold containing the synthetic resin forming the transparent portion of the iris button;

Figure 8 is an enlarged fragmentary side view in cross-section of the mold containing the transparent synthetic resin iris button with the iris and pupillary members incorporated therein;

Figure 9 is a side view in cross-section showing the iris button adapted to be incorporated into a ball portion;

Figure 10 is a side view in cross-section showing the iris button in the wax impression of an orbital cavity;

Figure 11 is a side view in cross-section of the mold flasks for forming the ball portion of the artificial eye;

Figure 12 is a top plan view of the finished artificial eye; and

Figure 13 is a side view in cross-section of the finished artificial eye.

The drawings and the construction of the artificial eye comprising this invention will best be understood from the following description of the several elements of the eye and the steps of the process for producing these elements.

The iris disc

The iris member consists of a flexible annular disc 1 formed from a transparent sheet of a cellulose plastic or synthetic resinous material. It is preferred to use a clear sheet of cellulose acetate having a thickness of approximately ten one thousandths of an inch though an emulsion-free photographic plate film may be employed. The disc 1 may be stamped, cut or otherwise formed from the sheet in an appropriate diameter varying from 10.5 to 12.5 millimeters. A circular opening 2 having a diameter of from 3 to 5 millimeters is formed in the center of the disc 1 which serves as a pupillary aperture in the finished artificial eye. The disc 1 and the pupillary aperture 2 may be formed in the same operation. All burs on the edges of the annular disc 1 are removed and the raw edge representing the pupillary aperture is beveled to prepare the disc 1 for painting.

The coloring materials applied to the iris disc 1 may be any light-fast pigmented coating composition. It is preferred to employ standard artist's oil pigments comprising mixtures of linseed or other drying oils and a pigment. The coloring of a natural iris may, in most cases, be reproduced with burnt umber, ivory black, flake white, Venetian red, cadmium yellow, cerulean blue and chromium oxide oil pigments or with blends thereof. The blending of the oil colors necessary to reproduce the coloring of a particular iris may be accompanied in the following manner: (1) Match the darkest color of the iris which will be found just within the margin of the limbus. This will be referred to as the background color. (2) The stroma color is prepared by blending appropriate oil pigments with the background color. For blue and green eyes the stroma color is prepared by adding a white pigment to a small amount of the background color mixture to lighten the latter. In brown eyes the stroma color is best matched by the addition of very small amounts of yellow and red pigments. (3) The collarette color is matched by modifying a small amount of the stroma color mixture with small amounts of yellow or red pigments. (4) In blue and green eyes, just at the margin of the collarette, another structural layer containing pigments ranging from white to yellowish brown is found. These pigments will most often occur as small specks each with a very fine attenuation extending toward the perimeter of the iris where they fade into nothingness or end with a nub just short of the area of the limbus. In cases where this structural layer of pigment is not atrophied, as described, it may appear as an uninterrupted film covering or overlaying the other iris pigments. In hazel eyes, this stratum is generally present as an area of brown radiating fibres extending a variable distance toward the perimeter and is found in the region of the collarette. In brown eyes, these pigmented areas are usually manifested as rust-colored elongated spots arranged in concentric fashion in the peripheral one-half.

The preparation of the coloring materials must be carried out with the view to effecting a proper consistency in order that brush marks which reproduce the stroma and various markings will have the proper design. The application of the coloring materials by hand is accomplished in the following manner: (1) The background color obtained by matching the dark area of the iris found just within the area of the limbus as described is applied without thinning. Using a broadly pointed brush, and starting approximately 1.5 millimeters from the pupillary aperture 2, the background color is applied with strokes to produce fairly heavy markings 3 radiating to the periphery of the disc 1 as shown in Figure 2A. Frequently this painting may be extended to include the blank area adjacent the periphery of the pupillary aperture 2, in which case the following step is eliminated: (2) The collarette color is thinned slightly with linseed oil and then applied with very fine strokes to produce the markings 4 radiating toward the pupillary aperture as shown in Figure 2B. The application of coloring materials to the posterior surface of the annular disc 1 is thus completed and the disc is now reversed and a light pigmented coating applied to the anterior surface thereof in the following manner: (3) The stroma color, which should also be thinned with linseed oil, is applied in lines 5 radiating from the margin of the collarette to within approximately 1 millimeter of the periphery of the disc 1 as shown in Figure 3A. The brush should be allowed to streak the paint rather than apply each line individually. (4) The pigmented areas 6 having attenuated portions 7 or other forms as indicated above are then applied over the stroma color lines 5 as shown in Figure 3B. The application of coloring materials to the anterior surface of the disc 1 should not be so thick that perception therethrough of the coloring materials deposited on the posterior surface of the disc 1 is obscured. If this is allowed to occur the third dimensional effect is obliterated. The optical effect of the superimposed plastic lens not only intensifies the color of the painting but also modifies the apparent proportions of the various painted areas, particularly in the central portion of the disc 1; i. e., the size of the pupillary aperture, the diameter of the collarette, and the dimensions of the markings in the region of the collarette and accordingly, these factors must be taken into consideration in depositing the coloring materials on the surfaces of the iris disc. The disc is then dried for several hours at a temperature of not more than 55° C. While the foregoing describes in detail a method of coloring the iris member by hand, the coloring materials may also be deposited on large sheets by standard printing processes and the colored discs then stamped out of the sheet in large quantities.

The iris button

The iris button indicated generally as 8 comprises a hemi-spheroidal member formed of a transparent synthetic resinous material. The hemi-spheroidal shape of the iris button is produced by forming it in a manner so that various segments thereof correspond to segments of different sized spheres. Thus, as shown in Figure 4, the upper segment 9 of the iris button 8 is the segment of a sphere having a radius of approximately 7.8 millimeters. The intermediate segment 10 is the segment of a sphere having a radius of approximately 11 millimeters. The upper and intermediate segments 9 and 10 serve to represent the cornea of a natural eye. The dimensions of the lowermost segment 11 are not important and may provide a substantially vertical surface. The foregoing dimensions are not critical but have been found to approximate closely the dimensions of the cornea of a natural eye. The design of the intermediate and lowermost segments 10 and 11 afford the advantage of producing a natural reproduction of the corneo-scleral junction of a natural eye when the iris button 8 is embedded in a translucent synthetic resin ball portion. The translucent resin above the lowermost segment 11 is completely opaque while that above the intermediate segment 10 blends evenly and gradually into nothingness at its junction with the segment 10 and corresponds to the corneo-scleral junction of a natural eye.

The iris button 8 is formed of a transparent synthetic resin, preferably a thermoplastic type of synthetic resin or a resin-forming material which may be easily polymerized by the action of heat. The following synthetic resins may be employed; polyvinyl chloride, polyvinyl acetate, copolymers of vinyl chloride and vinyl acetate, polystyrene, polymers of acrylic acid or substituted acrylic acid and polymers of esters of acrylic acid or substituted acrylic acid. Mixtures of monomeric and polymeric methyl methacrylate in the ratio of approximately one part of monomer to three parts of polymer are easily worked and are preferred.

The mold set for forming the iris button 8 is shown in Figure 5. It comprises a base 12 and a die-plate 13 provided with a plurality of cavities 14 having the hemi-spheroidal shape described. The cavities differ in size in one-half millimeter increments from about 11 to 12.5 millimeters to provide an assortment of different sized iris buttons. At the bottom of each of the cavities 14 there is provided a downwardly tapering opening 15 extending through the die-plate 13 and the lower face thereof. The openings 15 are adapted to form a stem portion integrally on the iris button. The upper face of the die-plate 13 has a pair of different sized lugs 16 formed thereon which are adapted to engage a pair of openings 17 of corresponding size in a baffle 18. A template 19 is provided with openings 20 corresponding in size to the cavities 14 in the die-plate 13 and adapted to register therewith. The template 19 is adapted to rest on the baffle 18 or the die-plate 13 and is provided with a pair of apertures 21 corresponding in size to the lugs 16. When the template 19 is positioned on the die-plate 13 with the lugs 16 extending into the apertures 21, the openings 20 register with the cavities 14. A cap 22 forms the top of the mold assembly.

In molding the iris button 8, the clear plastic mixture monomeric and polymeric methyl methacrylate is worked until the monomer is absorbed by the polymer and a rubbery consistency is obtained. The die-plate 13 is placed on the base 12 with a cellophane separator therebetween and small amounts of the clear plastic are forced into the cavities 14 and the openings 15. When a slight excess of plastic has been forced into the die-plate 13, a cellophane sheet is placed thereon and the baffle 18 is placed thereover with lugs 16 positioned in the openings 17. The template 19 is placed on the baffle 18 with a cellophane separator therebetween and the openings 20 are filled with clear plastic. A cellophane separator is placed on the template 19 and the cap 22 is placed on top. The mold thus packed and assembled as shown in Figure 7 is placed in a bench press and pressure applied until no space is apparent between the component parts of the mold. The mold is allowed to remain under pressure for at least twenty minutes. The mold is then removed from the press, the parts thereof separated, and the flash of excess plastic removed from the periphery of the cavities in the die-plate 13 and the template 19.

The transparent plastic portions of the iris button 8 are thus prepared for the step of incorporating the iris member 1 and a pupillary member 23. The pupillary member 23 comprises a disc formed from a jet black sheet of polyvinyl acetate or other jet black resinous material. The iris member 1 is placed on the plastic in the cavity of the template 19 and on the lower face thereof with the anterior surface of the iris member facing downwardly. The template is then placed on the die-plate 13 with the lugs 16 extending into the apertures 21. The pupillary member 23 is then placed on the plastic in the cavity of the template 19 on the upper face thereof and seated with a light pressure. When the iris member 1 and the pupillary member 23 have been placed in position, a sheet of cellophane is placed over the template 19, the cap 22 placed thereon and the mold, thus assembled as shown in Figure 8, is placed in a press and pressure applied until the faces of the several elements of the mold are in contact. The assembled mold and press are placed in an oven and heated at a temperature of about 71° C. for at least one hour and a half to polymerize the resin. The mold is then cooled and separated and the iris button 8 removed from the die-plate 13 by applying pressure to the end of the stem 24.

The iris button 8 formed in the above manner is then adapted to be incorporated in a translucent ball portion and form an artificial eye. The stem 24 formed thereon provides a means of handling the iris button 8 and may be used to manipulate the latter in a wax impression of the orbital cavity and also as a sighting axis to determine proper alignment of the iris button 8 in a wax impression. Additional functions of the stem 24 include that of positioning and securing the iris button 8 in a flask preparatory to molding a ball portion thereto and serving as means for handling the molded artificial eye subsequent to the molding operation. The surfaces of the iris member 1 are joined in a perfect optical union with the transparent resinous material and as a result reflect only the true colors of the pigmented coating deposited thereon. This eliminates the objectionable reflection of unnatural colors found heretofore in artificial eyes of this type. The above method of incorporating the iris member 1 in the iris button 8 causes the member to bulge slightly as shown in Figure 9 and render the anterior surface of the iris member slightly convex thus producing an anatomical representation of the anterior surface of the iris in a natural eye.

The iris button 8 with a stem 24 formed thereon comprises a very inexpensive stock item. A large number of these members may be prepared either by the method described above or by the more economical process of injection molding. Thus a stock comprising a variety of colors and sizes of iris buttons may be prepared from which one may be selected to match the remaining natural eye of the person being fitted. This arrangement eliminates the necessity of maintaining a large stock of artificial eyes of different sizes and shapes having irises of different sizes and colors. It also permits the iris button to be incorporated in a ball portion specially molded to measure from a synthetic resin which may be colored to an exact match of the color of the natural eye of the person to be fitted, or a blank which is approximately of the proper size, shape and color may be conformed to fit the orbital cavity of the person to be fitted and then used to provide a mold cavity in which a synthetic resin colored to match the color of the blank may be molded about the iris button.

The impression technique

The standard method of obtaining an accurate impression of the orbital cavity of a person to be fitted comprises the use of basic wax forms which are available commercially. In employing this method an area of about 12 millimeters in diameter is countersunk in the anterior surface of a basic wax form 25 just to one side of the center thereof and to a depth of about 2 millimeters. The iris button 8 is then placed in this cavity and the margins of the wax seared in the region of the limbus to secure the iris button. Care must be taken to blend the surface curvatures in this region into smooth transition as shown in Figure 10. In order to alter the basic wax to form a soft, contrast-colored wax; such as, a low melting point paraffin wax is used. This wax is added to the posterior surface and peripheral margins of the basic wax form and the form then placed within the socket. The heat of the body causes the added wax to flow and conform to the irregularities of the cavity. The basic wax form may be removed, observed and any additional wax applied and the operation repeated until the desired contours are achieved. The position of the iris button therein may be adjusted by searing the wax about the margin and manipulating the stem 24 while the wax is soft. It is preferred to center the iris button 8 in accordance with tests of the cardinal meridians of gaze. For example, should movement toward the medial canthus be only 20° and toward the lateral canthus 30°, the iris button is then placed about a millimeter closer to the medial canthus.

The preferred technique of preparing a wax form in accordance with this invention consists of injecting a gelatinous material capable of being chemically hardened into the orbital cavity. This method is preferred since the basic wax form technique described is not satisfactory in many instances as, for example, where it is necessary to fit extremely flaccid, irregular or large sockets. The gelatinous material employed is a salt of alginic acid, a gelatinous organic acid derived from various species of algae. It is characterized by its property of solidifying by chemical gelation rather than by thermal gelation. With this procedure five grams of the alginate and 300 mg. of a retarding agent are dissolved in about 25 cc. of distilled water at a temperature of from 70°–80° F. The mixture is spatulated about one minute or until a gelatinous consistency is obtained. The mixture is placed in an Eisle type of Luer syringe and the hub of the syringe then placed within the palpebral fissure. The gelatinous alginate is then rapidly injected into the socket being directed toward the superior cul-de-sac in order to preclude entrapping air. As soon as the alginate has established a normal contour to the upper lid and begins to extrude the syringe is removed. After about three minutes, during which time the lids are tightly closed, the eyelashes are freed, the flash of material at the palpebral fissure cut away and the impression is removed. The impression is then placed in a fixing solution for at least fifteen minutes to harden the alginate material. The hardened impression is then invested in a conventional flask with the anterior surface up. The complementary half of the flask is completed in the usual manner. The flasks are separated after the investing material has hardened and the hard alginate impression discarded. Heat is then applied to the flasks and warm wax is inserted into the cavity. The flasks are closed, placed in a press and pressure applied until the wax has reached an equilibrium. The mold is cooled, opened, the flask removed and the wax impression removed. The iris button 8 may then be incorporated in the wax impression as described and the form thus prepared for molding the sclera or ball portion.

The sclera

The procedure for incorporating the iris button 8 in a sclera or ball portion comprises flasking the basic wax form 25 having the iris button 8 embedded therein, in the conventional manner to form a mold as shown in Figure 11. The lower flask 26 is packed with an investing material 27 with the eye form positioned therein. In positioning the eye form, it is arranged with the posterior surface down and the stem 24 of the iris button 8 in a perpendicular position. Care is taken to avoid any undercuts. The stem 24 is covered with the tinfoil 24a and the upper flask 26' completed. When the investing material 27—27' has hardened, the flasks are separated and the wax removed. The iris button 8 is then carefully removed, the entire case tinfoiled and the iris button again inserted in the mold which is ready for packing.

The sclera is formed of a translucent synthetic resin, preferably a thermoplastic type of synthetic resin. The resins described as suitable for forming the iris button may be used in preparing the sclera member. In addition thereto, thermosetting resins having good moisture resistance may be employed; such as, alkyd resins. It is preferred, however, to employ polymerized methyl methacrylate in the form of a molding powder (80–120 mesh). The basic color of the molding powder is produced with a zinc oxide pigment which renders the transparent molding powder translucent. The basic scleral white shade is obtained by triturating the polymer and pigment in the ratio of 10 grams of polymer to 150 milligrams of zinc oxide. The polymer is placed in a mortar, the zinc oxide dusted thereover and the particles of clear plastic opacified by thoroughly triturating the mass with a pestle. The various scleral colors of a natural eye are then duplicated by triturating powdered color pigments into the basic scleral white resin mass. Thus to obtain the desired scleral color, various quantities of the following mixtures of pigments, depending upon the color intensity required, are triturated with the basic scleral white resin:

| Shade | | Pigment Mixture |
| --- | --- | --- |
| I | Brown | Burnt umber, 75 mg. and ivory black, 100 mg. |
| II | Yellow | Yellow ochre, 100 mg. and ivory black, 100 mg. |
| III | Green | Viridian, 100 mg. and ivory black, 100 mg. |
| IV | Blue | Cobalt blue, 150 mg. and ivory black, 100 mg. |
| V | Black | Ivory black, 250 mg. |

For example, the dark scleral colors may be obtained by triturating 10 grams of basic scleral white resin with 100 milligrams of the appropriate pigment mixture. The medium and light scleral colors may then be prepared by diluting the dark scleral colored resin mass with increased amounts of the basic scleral white resin.

The colored translucent resin molding powder, prepared as described, is packed in the mold and heat applied to the mold to fuse or polymerize the resin over the iris button. The mold is then separated, the artificial eye withdrawn and the flashing removed therefrom. The prosthesis is polished with pumice taking particular care to establish the proper limbus. If it is desired to increase the apparent diameter of the iris, it is polished back a little. A little more of the limbus is allowed to remain toward the medial canthus in order to decenter slightly the pupil in that direction.

The veining technique

The scleral veins are reproduced by applying red or brown fibres 28 to the surface of the sclera or ball portion 29. The proper colored or combination of colored fibres are selected and shredded to obtain the monofils. The surface of the ball portion 29 is rendered tacky by applying a thin solution of polymeric methyl methacrylate in the monomer thereof or an alcohol-chloroform solution. The fibres are lightly impressed on the tacky surface, observing and following the degree of veining, the pattern of the veins, and the various diameters of the veins of the natural eye of the person being fitted. The diameter of a single vein may be increased by running two or three monofils together. The veins duplicated usually arise from the medial and lateral canthi and terminate upon reaching the limbus or before. Interrupted venous courses may be effected by breaking the continuity of the veins by carefully sandpapering them. In order to effect the structureless and delicate capillary beds 30, a thin solution of polymeric methyl methacrylate in the monomer thereof containing a red dry pigment is delicately and sparingly applied. Similarly, liquid resin containing oil or powder pigments in green, yellow or other color may be applied sparingly to the ball 29 in order to produce the characteristic color tinges 31 toward the medial and lateral canthi.

The veining fibres 28 may be of any material which will retain its circular cross-section when the conjunctiva layer 32 is applied to the artificial eye. The fibres of certain materials demonstrate a tendency to become flat when the conjunctiva layer is applied and thus provide an unnatural appearance. It has been found that rayon fibres retain their form under these conditions and are, therefore, preferred for the purpose of simulating the veins of a natural eye.

The conjunctiva

The conjunctiva layer 32 is reproduced with an overlay of transparent synthetic resin. This coating of resin may be applied by molding, spraying or dipping methods, though the latter method is preferred. The advantage of employing the method of dipping the artificial eye in clear liquid plastic lies in that the slightly irregular surfaces produced by the underlying structures, such as the fibres 28, the capillary beds 30, and the color patches 31, are preserved. These irregularities eliminate high lights or glare and other objectionable reflections from the surface of the artificial eye.

The clear liquid plastic employed is preferably a thin syrupy mixture of polymeric methyl methacrylate in the monomer thereof. This may be prepared by mixing about a 10 per cent solution of the polymer in the monomer and heating the solution slightly while mixing to accelerate the solvent action of the monomeric methyl methacrylate. Prior to dipping the artificial eye in the liquid plastic it is annealed for about 15 minutes at a temperature of approximately 71° C. in a drying oven to prevent subsequent crazing of the plastic. Using the stem 24 to manipulate the artificial eye, it is dipped carefully into the liquid plastic and rotated slowly while immersed so as not to incorporate air bubbles into the solution. The artificial eye is removed from the solution and the liquid plastic allowed to drain toward an area which subsequently can be polished easily; i. e., the peripheral margin. The artificial eye is rotated until a surface skin has been developed on the liquid coating. These operations may be accomplished by hand or by equipment designed to dip and gyrate the prosthesis. The first layer of the liquid coating may be dried in the open air for about one-half an hour or in a drying oven at about 71° C. for about 15 minutes. Subsequent dippings should be made as quickly as possible so as not to soften the material already applied and followed by shorter drying periods. When the thickness of the conjunctiva layer 32 has been built up to a thickness of approximately one-half of a millimeter, the final drying may be accomplished. After the preliminary set of the clear resin overlay, the entire prosthesis may be cured in an oven at 100° C. for a period of 20 minutes or immersed in boiling water for a like period. The artificial eye is then ready for final buffing.

*Subsequent treatment*

The completed prosthesis requires little or no polishing. The stem 24 is removed and the surface where it was attached to the iris button 8 is carefully polished. The prosthesis is inserted and the eyelid relationship, the degree to which objectionable depressions have been eliminated, and the mobility are checked. Ordinarily, the newly inserted eye will slightly protrude and the eyelids will stand a little more apart than appears to be normal. Nevertheless, a slight exaggeration of these features is desired as some compensatory degree of tissue change will occur. Even though some features such as a slight strabismus may occur, it is best to have the patient wear the eye for a short period as such a discrepancy may correct itself spontaneously.

*Conclusion*

Summarizing the foregoing, it is apparent that the invention resides primarily in providing an artificial synthetic resin eye formed of the following elements: a translucent ball portion having colored fibrous vein members supported on the surface thereof, a transparent iris button into which a transparent annular iris disc having a coloring material deposited thereon and a pupillary member are incorporated, and an overlying transparent conjunctiva layer having an irregular surface. The transparent annular iris disc is coated with light-fast oil pigments to simulate the colors of the iris of a natural eye. The predominant darker coloring found in the limbus and collarette areas of a natural iris is reproduced on the posterior surface of the transparent annular disc while the lighter coloring and markings found in the stroma area of a natural iris are reproduced on the anterior surface of the annular disc. The pigmented coating on the posterior surface of the annular disc is visible through the anterior surface thereof and, thus, a three-dimensional effect is produced with the result that a remarkably life-like reproduction of the iris of a natural eye is obtained. The provision of a separate pupillary member comprising a jet black resin sheet positioned posteriorly of the annular iris disc and across the aperture therein produces an additional three-dimensional effect which further improves the appearance of the eye. The three-dimensional effects described are enhanced by the cornea portion of the iris button which functions as a magnifying lens and emphasizes the appearance of depth. The colors of the pigmented coatings are reflected naturally as a result of the step of embedding the annular disc in the material used to form the iris button and fusing or polymerizing this material over and in contact with the coated disc thus forming a perfect optical union therebetween. Finally, the reflectivity of the conjunctiva layer is reduced by irregularities in the surface thereof formed by the fibrous veining members with the result that any tendency to produce high lights on the surface of the artificial eye is eliminated. The construction described and the method of producing and uniting the above elements provide an excellent reproduction of a natural eye, particularly with regard to color and size of iris; size of pupil; size and shape of cornea; color, size and shape of sclera; and amount, size and distribution of veins.

Having thus described our invention, what we claim as new and wish to secure by Letters Patent is:

1. An artificial eye comprising an eyeball formed of a synthetic resinous material, an iris incorporated therein comprising a transparent disc having a heavy pigmented coating on the posterior surface thereof and a light pigmented coating on the anterior surface thereof adapted to permit visual perception of said heavy pigmented coating through the anterior surface of said disc, and a pupillary member incoporated in said eyeball.

2. An artificial eye comprising an eyeball formed of a synthetic resinous material, an iris incorporated therein comprising a transparent disc having a heavy pigmented coating on the posterior surface thereof in the limbus and collarette areas and a light pigmented coating on the anterior surface thereof in the stroma area adapted to permit visual perception of said heavy pigmented coating through the anterior surface of said disc, and a pupillary member incorporated in said eyeball.

3. An artificial eye comprising an eyeball formed of a synthetic resinous material, an iris incorporated therein comprising a transparent annular disc having a heavy pigmented coating on the posterior surface thereof and a light pigmented coating on the anterior surface thereof adapted to permit visual perception of said heavy pigmented coating through the anterior surface of said disc, and a pupillary member incorporated in said eyeball.

4. An artificial eye comprising an eyeball formed of a synthetic resinous material, an iris incorporated therein comprising a transparent apertured annular disc having a heavy pigmented coating on the posterior surface thereof and a light pigmented coating on the anterior surface thereof adapted to permit visual perception of said heavy pigmented coating through the anterior surface of said disc, and a pupillary member comprising a pigmented sheet incorporated in said eyeball posterior to said iris disc and across the aperture thereof.

5. An artificial eye comprising an eyeball formed of a synthetic resinous material, an iris incorporated therein comprising a transparent sheet member having a heavy pigmented coating on the posterior surface thereof and a light pigmented coating on the anterior surface thereof adapted to permit visual perception of said heavy pigmented coating through the anterior surface of said sheet member, and a pupillary member incorporated in said eyeball.

6. An artificial eye as set forth in claim 1 characterized in that said iris comprises a transparent disc having a convex anterior surface.

STANLEY F. ERPF.

No references cited